C. L. FRIDAY.
HOSE COUPLING.
APPLICATION FILED JULY 30, 1908.
921,691. Patented May 18, 1909.
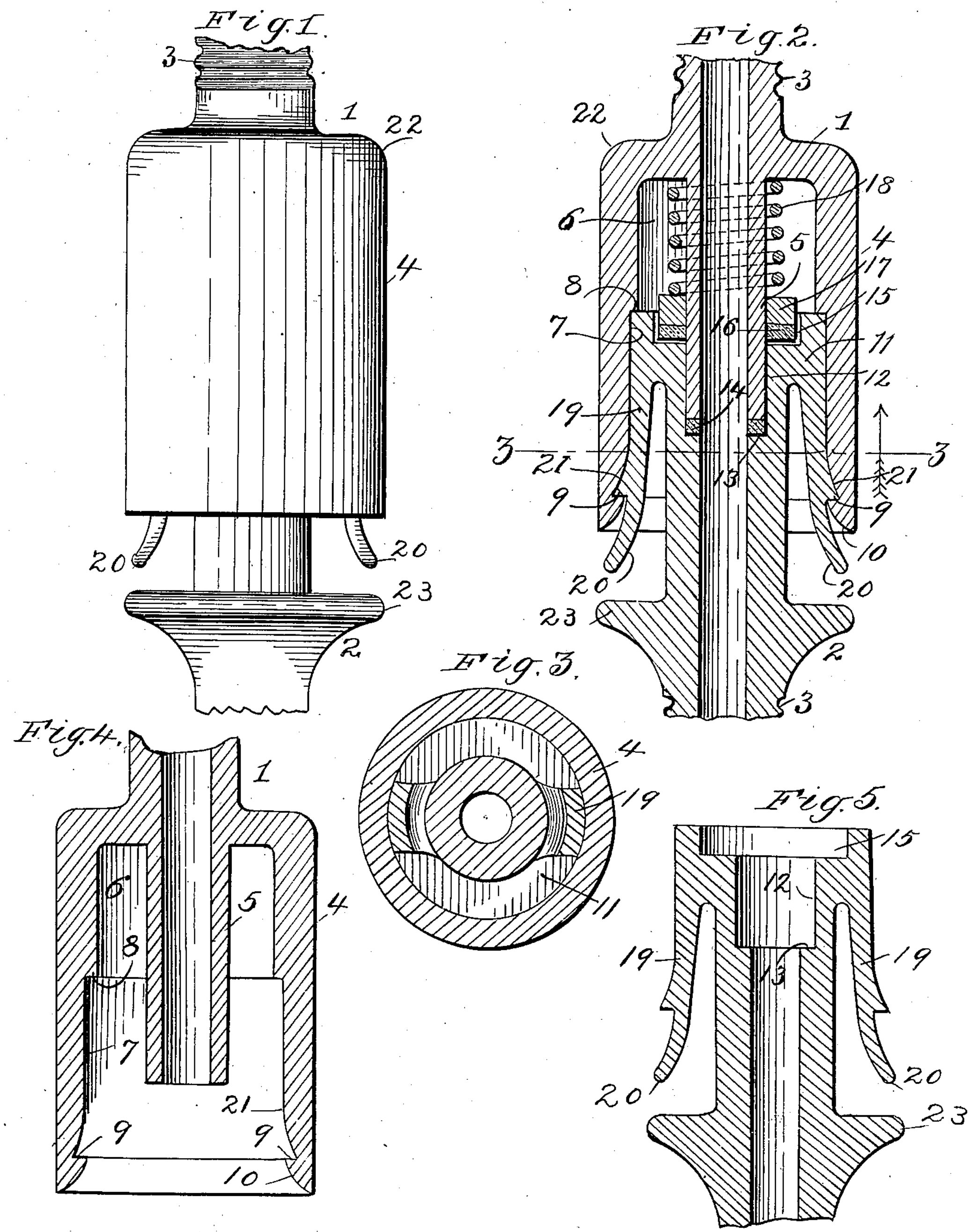
Witnesses
M. L. Skinner.
W. R. Edelen,
Inventor
Chester L. Friday
By Watson E. Coleman
Attorney

UNITED STATES PATENT OFFICE.

CHESTER L. FRIDAY, OF QUINCY, ILLINOIS.

HOSE-COUPLING.

No. 921,691. Specification of Letters Patent. Patented May 18, 1909.

Application filed July 30, 1908. Serial No. 446,171.

*To all whom it may concern:*

Be it known that I, CHESTER L. FRIDAY, a citizen of the United States, residing at Quincy, in the county of Adams and State of Illinois, have invented certain new and useful Improvements in Hose-Couplers, of which the following is a specification, reference being had to the accompanying drawings.

My invention relates to improvements in detachable couplers for hose and pipes, and it consists of the novel features of construction and the combination and arrangement of parts hereinafter fully described and claimed.

The object of the invention is to provide a simple and practical device of this character by means of which two sections of a hose may be quickly and easily connected together to provide a water tight joint and as readily separated or disconnected.

The above and other objects of the invention are attained in its preferred embodiment illustrated in the accompanying drawings, in which—

Figure 1 is a side elevation of my improved detachable hose coupler; Fig. 2 is a longitudinal section showing the two parts or sections engaged; Fig. 3 is a cross section taken on the plane indicated by the line 3—3 in Fig. 2; Fig. 4 is a longitudinal section through the socket member or section; and Fig. 5 is a side elevation of the jaw member or section.

In the drawings 1 and 2 denote respectively the socket and the jaw members or sections of my improved hose coupler. These sections are tubular and their outer ends which are adapted to be inserted in the hose sections to be coupled, are provided with one or more annular ribs or corrugations 3 which serve to effectively retain the members in the hose sections. The inner end of the member 1 has an enlarged cylindrical portion 4 which is hollow and from the bottom of which projects a concentric tubular portion 5. The bore or passage through the body of the member 1 extends also through the tubular projection 5 and the latter terminates short of the open outer end of the enlargement 4. The bore or cavity in the enlargement 4 has a reduced cylindrical inner portion 6 and an enlarged cylindrical outer portion 7, an annular shoulder 8 being formed between said portions. Adjacent to the outer end of the enlarged portion 7 is an annular groove or seat 9 of V-shape in cross section with its outer wall disposed transversely or in a plane at right angles to the axis of the member 1 and its inner wall inclined inwardly and rearwardly. The inner edge of the open end of the enlargement 4 is beveled or inclined inwardly, as at 10, from the outer surface of said enlargement to the transverse wall of the groove 9 to provide a flaring mouth.

The jaw member 2 of the coupler has at its inner or free end a cylindrical enlargement or head 11 adapted to fit the enlarged portion 7 of the bore or cavity of the enlargement 4 and to have its extremity engage the shoulder 8 when the two members 1, 2 are coupled. Extending through the head 11 and into the outer portion of the body of the member 2 is a cylindrical socket or cavity 12 which is concentric with the bore or passage through the member 2 and the bottom of which forms an annular stop shoulder 13. Said cavity 12 is adapted to receive the tubular portion 5 of the member 1 and between the outer end of said portion 5 and the shoulder 3 is interposed an elastic washer or gasket 14. Formed in the outer face of the head 11 concentric with the cavity or socket 12 is an annular groove or seat 15 which receives a rubber gasket or washer 16 carried by a plunger ring 17 arranged for sliding movement on the tubular portion 5 and attached to one end of a coil spring 18, which latter surrounds said portion 5 and has its other end suitably fixed in the reduced inner portion 6 of the cavity in the enlargement 4. Projecting rearwardly from the head 11, preferably at diametrically opposite points, are resilient jaw carrying arms 19 the free ends 20 of which are shaped to provide finger pieces. Intermediate the ends of these resilient arms 19 are arranged jaws 21 which are arc-shaped or curved longitudinally and which are disposed transversely on said arms and are of V-shape in cross section so as to fit the groove or seat 9 in the outer portion of the enlargement 4. It will be seen that by pressing the finger pieces 20 of said jaw carrying arms inwardly toward the body portion of the member 2 the jaws 21 may be disengaged from the annular groove or seat 9 so that the two members of the coupling may be readily separated and that when the member 2 is pushed into the member 1 said jaws will spring into engagement with their groove or seat to lock the two members together. It will also be noted that owing to the provision of the telescoping engagement of the several parts of the two members and to the gaskets 14, 16 and the spring plunger 17, the coupler will provide both a water and air tight joint between the two sections of the hose or pipe that are coupled together.

In order to permit the sections of the hose to be readily drawn over the ground or over other uneven surfaces, I provide the inner portion of the enlargement 4 with a rounded or curved edge 22 and I provide upon the member 2, at a suitable distance from the finger pieces 20 of the jaw members, an annular guard flange or rib 23 the outer face of which is curved, as shown. Said guard flange is made substantially the same diameter as that of the enlargement 4 so as to project beyond the outer ends of the finger pieces 20 and to prevent them from catching on to anything when the hose is being drawn over a rough or uneven surface.

Having thus described my invention what I claim is:

The herein described hose coupler comprising socket and jaw members each having means at their outer ends for the attachment of a hose section, the socket member having an enlarged cylindrical inner portion formed with a rounded inner edge, said enlarged portion being formed with a cavity having inner and outer portions of different diameters, the outer portion of the cavity being of greater diameter and forming an annular shoulder, said outer portion of the cavity being also formed with a flaring outer end and with an annular groove forming an annular shoulder, said socket member being also formed with a tubular cylindrical portion arranged within the cavity in said enlarged portion of the member and formed integral with the bottom of said cavity, a coil spring arranged on said tubular portion, a washer slidable on said tubular portion and actuated by said spring, said jaw member having at its inner end an enlarged cylindrical head to fit the enlarged outer portion of the cavity in the socket member and to engage the shoulder formed by said enlarged portion of the cavity, said head being formed with a concentrically arranged socket to receive the tubular portion on the socket member and in its outer end with a concentric groove or seat to receive said washer, said jaw member being also formed with an integral radially projecting annular guard flange corresponding in diameter to that of the enlarged inner portion of the socket member and having its outer face inclined, a gasket at the bottom of the socket in said head of the jaw member and engaged by the extremity of the tubular portion of the socket member, outwardly projecting resilient arms extending rearwardly from the head of the jaw member at diametrically opposite points and formed at their outer ends with outturned finger pieces adapted to lie between said guard flange and the end of the enlarged inner portion of the socket member, the intermediate portions of said resilient arms being formed with V-shaped projections to engage the annular shoulder formed in the socket member adjacent its ends.

In testimony whereof I hereunto affix my signature in the presence of two witnesses.

CHESTER L. FRIDAY.

Witnesses:
LEWIS F. FUELBIER,
D. W. MUMPER.